HIGH VOLTAGE DIRECT CURRENT TRANSMISSION SYSTEM WITH CONDITION RESPONSIVE, TUNABLE, HARMONIC FILTERS

Filed Aug. 31, 1966

INVENTORS
Francis D. Kaiser
and John C. Rissinger
BY
Donald R. Lackey
ATTORNEY

United States Patent Office 3,395,327

Patented July 30, 1968

3,395,327

HIGH VOLTAGE DIRECT CURRENT TRANSMISSION SYSTEM WITH CONDITION RESPONSIVE, TUNABLE, HARMONIC FILTERS

Francis D. Kaiser and John C. Rissinger, Sharon, Pa., assignors to Westinghouse Electric Corporation, Pittsburgh, Pa., a corporation of Pennsylvania Filed Aug. 31, 1966, Ser. No. 576,341

9 Claims. (Cl. 321—2)

ABSTRACT OF THE DISCLOSURE

A high voltage direct current power transmission system which includes self-tuning harmonic filter means. The filter means includes a plurality of series branches each having serially connected inductance and capacitance means tuned to series resonance at a predetermined harmonic frequency. Each branch also includes sensing means and tuning means, with the sensing means providing a signal when its associated branch is not in series resonance, and with the tuning means, in response to the signal from the sensing means, changing the value of the inductance means as required to return the branch to series resonance.

Figures 1, 2:
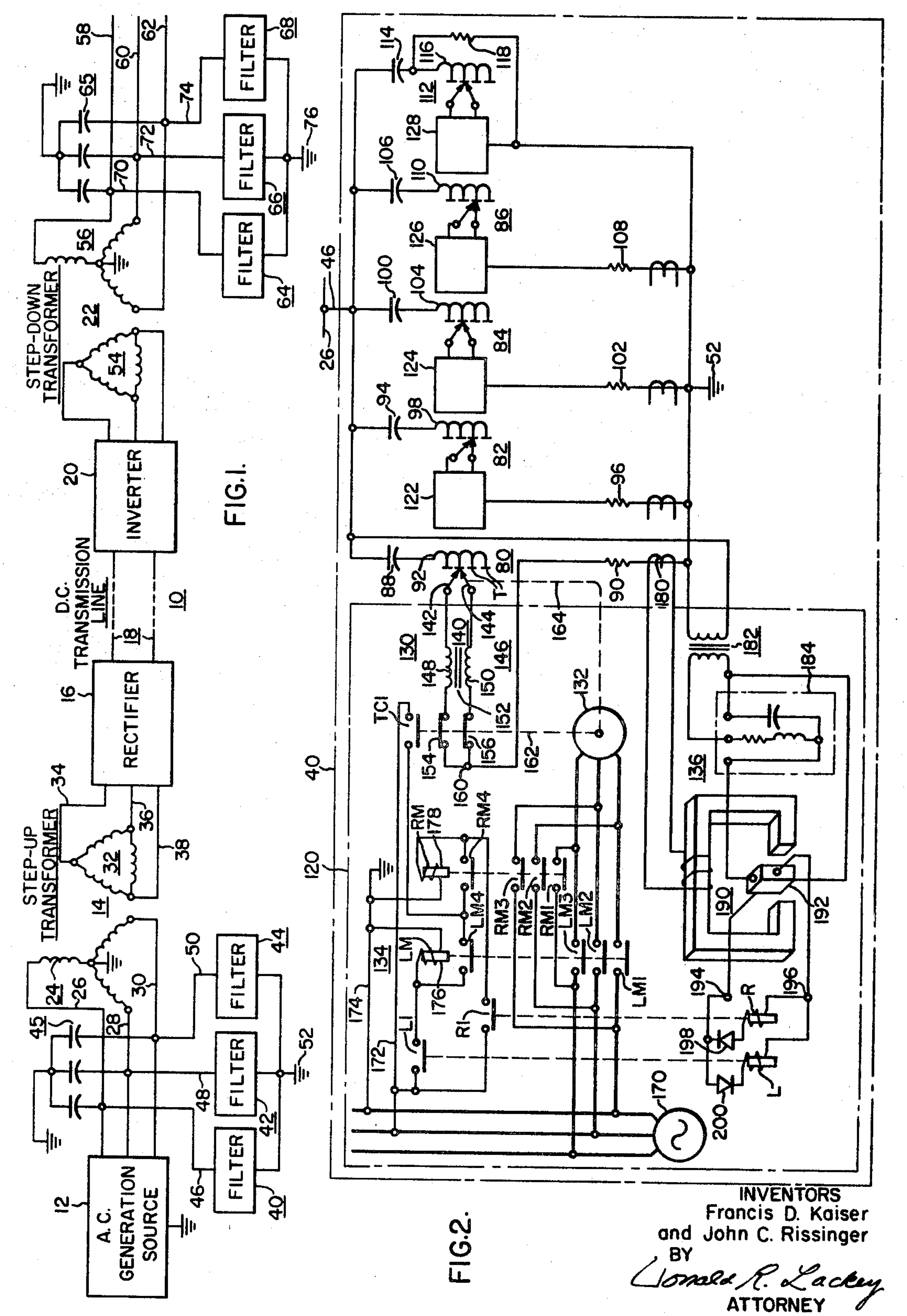

This invention relates in general to high voltage direct current transmission systems, and more particularly to self tuning filter circuits for high voltage direct current transmission systems which limit the maximum harmonic content in the system.

Harmonics in the alternating current portion of a direct current power transmission system, produced by the switching action of the rectifiers and inverters, may create disturbances in communication systems by electromagnetic and/or electric induction, as well as exciting inductive and capacitive portions of the system to series resonance, which may create large harmonic currents and overload these portions of the system. Therefore, in high voltage direct current power transmission systems, it is necessary to provide filters or tuned circuits which are designed to shunt the higher magnitude harmonics to ground. In a direct current power transmission system which uses a six-phase converter, the harmonic frequencies which are usually filtered are the fifth, seventh, eleventh, thirteenth, seventeenth and nineteenth. In general, the higher the order of the harmonics, the lower its magnitude. Therefore, higher order harmonics do not usually present a problem. In high voltage direct current power transmission systems, the magnitude of these lower order harmonic frequencies must be limited to predetermined maximums, and any drift by the tuned filter circuits is undesirable, because the system KVA rating would have to be reduced accordingly, in order to keep the magnitude of the harmonic frequencies within prescribed maximums. In other words, since the magnitude of the harmonics is directly proportional to the system load, if the filter circuits do not stay sharply tuned, or in resonance, the system rating would have to be reduced accordingly. Thus, the filters must be accurately tuned to the predetermined harmonic frequencies whose magnitudes are to be limited, and this sharp tuning must be maintained for all load and temperature conditions.

In order to provide capacitors in the filter circuits which have a substantially constant capacitance over their operating temperature range, and thus prevent drift of the tuned filter circuits due to ambient and load induced temperature changes, mineral oil has been commonly resorted to as the dielectric for the capacitors, because of the stable dielectric constant of mineral oil over the operating temperature range of the capacitors. Mineral oil capacitors, however, have a lower dielectric constant than the synthetic oils such as those formed of chlorinated diphenyl and trichlorobenzene, commonly called Askarel. Askarel filled capacitors, for a given KVAR rating, are thus smaller and less costly than similarly rated mineral oil filled capacitor units. The value of the capacitance of Askarel filled capacitors, however, is not as stable as the value of the capacitance of mineral oil filled capacitors, as the dielectric constant of Askarel changes with temperature. Therefore, the cost savings by using Askarel capacitors is offset by the derating of the power system necessary in order to keep the magnitude of the harmonics within predetermined limits.

Accordingly, it would be desirable to be able to utilize the lower cost Askarel filled capacitors, if their use did not require the derating of the high voltage direct current power transmission system.

Further, in some applications, the source of the alternating potential may be a prime mover whose speed may vary, such as a waterwheel generator. Presently, costly governors are required to control the speed of these prime movers to provide a frequency which is within the close tolerances specified on electrical power systems. If the generator alternating potential is to be changed to a direct current potential, and then back to an alternating current potential, the frequency of the generated alternating potential is no longer critical from the standpoint of its usage. However, with prior art high voltage direct current power transmission systems, the same expensive, close tolerance frequency control is still essential, because the branches of the harmonic filters are tuned to predetermined fixed frequencies. Thus, it would be desirable to be able to relax the close tolerance on the frequency of the alternating potential which is to be changed to a direct current potential, in high voltage direct current power transmission systems, without derating the system due to an increase in the magnitude of harmonics.

Accordingly, it is an object of the invention to provide a new and improved high voltage direct current power transmission system.

Another object of the invention is to provide a new and improved high voltage direct current power transmission system which will keep the magnitude of predetermined orders of harmonics within prescribed maximum limits, without derating the power system.

A further object of the invention is to provide new and improved filter circuits for high voltage direct current power transmission systems, which will stay tuned to their respective orders of harmonics over the operating temperature range of the filter capacitors.

Still another object of the invention is to provide new and improved filter circuits for high voltage direct current power transmission systems which will maintain series resonance at predetermined orders of harmonics, even when utilizing capacitors in the filter circuits whose value of capacitance may change over their operating temperature range.

Another object of the invention is to provide a new and improved high voltage direct current power transmission system in which the frequency of the alternating potential which is to be changed to a direct current potential may be allowed to vary between predetermined relaxed tolerance limits, without derating the system.

A further object of the invention is to provide a new and improved high voltage direct current power transmission system which has harmonic filters which automatically tune themselves to maintain resonance, when the frequency of the harmonics change and/or when the value of the capacitance of the filter capacitors change.

Briefly, the present invention accomplishes the above-cited objects by providing a high voltage direct current power transmission system which utilizes self-tuning filter circuits. These filter circuits automatically maintain resonance and maximum tuning sharpness at their respective orders of harmonics, regardless of changes in the value of the capacitors in the filter capacitor banks, or changes in the frequency of the harmonics. Thus, lower cost capacitors may be used which substantially reduces the overall system cost, and lower cost governors may be used when the alternating potential to be rectified is generated by certain types of prime movers, such as waterwheel generators.

Specifically, the present invention provides an adjustable inductance serially connected with capacitors in each tuned circuit or filter, for each order of harmonic to be filtered. Tap changer means, connected to the adjustable inductance means, is responsive to sensing or regulating means which senses a predetermined condition or quantity, to change the magnitude of the circuit inductance as the value of the capacitance changes, or as the harmonic frequency changes, or both, to maintain series resonance in the filter branch.

Further objects and advantages of the invention will become apparent from the following detailed description, taken in connection with the accompanying drawings, in which:

FIGURE 1 is a schematic diagram illustrating a typical high voltage direct current power transmission system, and FIG. 2 is a schematic diagram of a self-tuning filter circuit constructed according to the teachings of the invention, which may be used in the high voltage direct current power transmission system shown in FIG. 1.

Referring now to the drawings, and FIG. 1 in particular, there is shown a high voltage direct current power transmission system 10, which includes a source of alternating potential 12, a step-up transformer 14, rectifier means 16, a direct current transmission line 18, an inverter 20, and a step-down transformer 22.

The source of alternating potential 12 which may be a three-phase alternator or alternators, is connected to primary winding 24 of transformer 14 via electrical conductors 26, 28 and 30. Transformer 14 steps up the generated alternating potential to a predetermined magnitude in secondary winding 32, suitable for rectification and high voltage direct current power transmission. Secondary winding 32 is connected to the input terminals of rectifier 16 via conductors 34, 36 and 38. Rectifier 16 may be of any suitable type, such as a semiconductor bridge-type rectifier having a plurality of diodes or controlled rectifiers.

The power factor of the system to this point is lagging, due to the inductance of the transformer windings and the inductance of the rectifier 16, Therefore, capacitors may be connected to the various phases of the generated alternating potential. Since the alternating current drawn by rectifier 16 is not a sinusoidal wave, but has a flattened top, harmonic currents of various frequencies are produced. The lower order harmonic currents, which have the largest magnitude, may be reduced in magnitude by filter circuits 40, 42 and 44, which are connected to conductors 26, 28 and 30 via conductors 46, 48 and 50 respectively. Filter circuits 40, 42 and 44 may be grounded as shown at 52. Filter circuits 40, 42 and 44 each include a plurality of parallel connected series circuits comprising inductance means and capacitance means, with the capacitance means in the filters being used to improve the power factor of this portion of the system. Additional banks of capacitors may be connected to conductors 26, 28 and 30 if required, such as capacitor bank 45.

The high voltage direct current power produced at the output terminals of rectifier 16 is transmitted via direct current transmission line 18 to the input terminals of inverter 20. Inverter 20 converts the direct current potential to an alternating current potential of a predetermined frequency, such as 60 cycles. The alternating current potential at the output terminals of inverter 20 is connected to the primary winding 54 of transformer 22, in order to provide an alternating potential in secondary winding 56 of a predetermined lower magnitude. Secondary winding 56 is connected to an alternating current transmission line comprising conductors 58, 60 and 62.

Since proper inverter operation requires that the current always lead the voltage, the inverter must be supplied with reactive power. Also, since the inverter generates the alternating current potential by switching, it contains both voltage and current harmonics, the order of which depends upon the number of phases in the converter. Because of the adverse affect of at least the relatively large magnitude lower harmonics on various types of communications, such as telephone and telegraph, the magnitude of these harmonics must be reduced to a predetermined maximum. The required reactive power for the inverter and filtering for the various lower harmonics may be provided by filter circuits 64, 66 and 68, which are connected across the various phases of secondary winding 56 of transformer 22 via conductors 70, 72 and 74, to ground 76. Additional capacitor banks may be connected to conductors 58, 60 and 62, if required, such as capacitor bank 65.

The filter circuits 40, 42, 44, 64, 66 and 68 for the various electrical phases on the alternating current portions of the system, each include a plurality of branches of serially connected inductance and capacitance means. Since the total KVAR rating of the capacitance required is substantial, its cost is a significant portion of the overall system cost. Therefore, it is desirable to use capacitors having the lowest cost per KVAR, such as Askarel filled capacitors, as opposed to mineral oil filled capacitors, if they may be used without the necessity of derating the maximum power rating of the system to keep the magnitude of the harmonics within allowable limits. Also, assuming for purposes of example that the alternating current generator source 12 is a waterwheel generator, it would be desirable to allow the speed of the generator to change with water head, between predetermined relaxed limits, as its frequency is not critical except in regard to the tuned filter circuits 40, 42 and 44. If the criticality of the frequency regarding the filter circuits could be overcome, the cost of the waterwheel generator system could be reduced. FIG. 2 is a schematic diagram of a self-tuning filter circuit constructed according to the teachings of the invention, which may be used for each of the filter circuits shown in FIG. 1 to accomplish these objectives. Since each of the filter circuits shown in FIG. 1 may be similar to one another, only one of them, such as filter circuit 40, is shown in FIG. 2.

Filter circuit 40 includes a plurality of parallel connected, series branches 80, 82, 84 and 86, with the number of branches being determined by the number of harmonics to be shunted through the filter. Each branch 80, 82, 84 and 86 of filter 40 are similar in construction, but will be tuned to different harmonic frequencies. For example, branch 80 may include capacitor bank 88, resistance means 90, and adjustable or tapped inductor 92, which are serially connected from conductor 26 to ground 52, and which are tuned, in a six-phase system, to provide series resonance at the frequency of the fifth harmonic. In like manner, branch 82, which includes capacitor bank 94, resistance means 96, and tapped inductor 98, would be tuned to the frequency of the seventh harmonic. Branch 84, which includes capacitor bank 100, resistance means 102, and tapped inductor 104, would be tuned to the frequency of the eleventh harmonic. Branch 86, which includes capacitor bank 106, resistance means 108 and tapped inductor 110, would be tuned to the frequency of the thirteenth harmonic. In tuning each branch of filter 40, the following equation is applicable:

$$(2\pi f)^2 LC = 1$$

where $f$ is the frequency, L is the inductance of the inductor in henries, and C is the capacitance of the capacitor bank in farads.

In addition to the series resonant branches of filter circuit 40, each tuned to a different specific harmonic frequency, filter 40 may also include a branch 112 which is a low pass filter designed to have a high impedance to the fundamental frequency, and a low impedance to higher frequencies. Low pass filter 112 includes a capacitor bank 114 and tapped inductor 116 serially connected between conductor 26 and ground 52, and resistance means 118 connected across inductor 116. Filter branch 112 is designed to have a high impedance to frequencies lower than the lowest harmonic, and a low impedance to higher frequencies, and thus aids in shunting to ground all harmonics, as well as providing power faction correction to the system. If a twelve-phase system is utilized, the fifth and seventh harmonic branches may be eliminated.

For a particular branch of filter 40 to be resonant at the harmonic frequency it was designed to shunt, the reactance $X_L$ of the inductance must be equal to the reactance $X_C$ of the capacitance. If the capacitive reactance $X_C$ changes due to a change in the capacitance value of the capacitor bank, for example, due to a change in the dielectric constant of the capacitors due to load or ambient induced temperature changes, the inductive reactance $X_L$ must also change to maintain resonance. Or, if the harmonic frequency changes due to a change in the frequency of the fundamental, the inductive reactance $X_L$ and the capacitive reactance $X_C$ will both change and either the capacitance or inductance, or both, will have to be changed in value to regain resonance at the new frequency. Since the KVAR of the capacitor banks will usually be very large, it is not desirable to switch capacitors and the capacitive current, in order to maintain the capacitive reactance $X_C$ equal to the inductive reactance $X_L$. Therefore, according to the teachings of the invention, the inductive reactance $X_L$ is changed, to maintain series resonance in each branch, as the capacitive reactance $X_C$ changes. Since the capacitive reactance $X_C$ must always equal the inductive reactance $X_L$ at series resonance, to maintain series resonance when the value of the capacitance increases the value of the inductance must be decreased accordingly. If the value of the capacitance decreases, the value of the inductance must increase to maintain series resonance. If the frequency of the harmonic drops, the capacitive reactance increases, and the inductive reactance decreases. Therefore, the value of the inductance must increase to provide resonance at the lower frequency. If the frequency of the harmonic increases, the capacitive reactance decreases and the value of the inductance must drop to provide resonance at the higher frequency. Therefore, according to the teachings of the invention, each variable or tapped inductor in the various series resonant branches 80, 82, 84 and 86, includes means for sensing when the branch is not sharply tuned to resonance, and tap changer means is included to change taps on the inductor, and thus change the number of effective turns of the inductor connected in the series circuit, to sharply tune the branches.

More specifically, each branch of filter 40, such as branch 80, has sensing and tap changing means 120, branch 82 has sensing and tap changing means 122, branch 84 has sensing and tap changing means 124, and branch 86 has sensing and tap changing means 126. Since the sensing and tap changing means for each branch is similar, only the sensing and tap changing means for branch 80 is shown in FIG. 2.

Branch 112 of filter 40, not being tuned to a specific harmonic frequency, may not require tuning. However, in the event that it is desirable to tune the low pass filter branch 112 to accurately maintain a predetermined low pass bandwidth, sensing and tap changing means 128 may be provided.

Sensing and tap changing means 120 may include a tap changer 130 of any suitable construction, tap changer drive means 132, starter means 134 for tap changer drive means 132, and sensing means 136 which determines when branch 80 is not in resonance and automatically signals starter means 134 to energize tap changer drive means 132 in the proper direction necessary to change the number of turns of the inductor 92 in the circuit and achieve resonance at the new capacitance and/or new harmonic freqency.

Tap changer means 130, for purposes of this example, includes a no-load type selector switch 140 which has a plurality of stationary contact positions T connected to the various tap positions on inductor 92, and a pair of movable contact arms 142 and 144 for sequentially moving between and making contact with the stationary contact positions T. Also included in tap changer means 130 is a split reactor or preventive autotransformer 146, which has first and second winding sections 148 and 150 wound upon a common magnetic core structure 152. Winding sections 148 and 150 are wound to provide a negligible impedance to load current flow, and a high impedance to circulating currents produced when movable contact arms 142 and 144 are in contact with different tap positions. First and second underload type transfer switches 154 and 156 are also provided. Transfer switch 154 is connected serially with winding portion 148 of preventive autotransformer 146, and movable contact arm 142 of selector switch 140. Transfer switch 156 is serially connected with winding portion 150 of preventive autotransformer 146 and movable contact arm 144 of selector switch 140. Transfer switches 154 and 156 are connected in common at terminal 160, and terminal 160 is connected to resistance means 90. Thus, filter branch 80 includes the series circuit comprising capacitance means 88, the portion of inductor means 92 connected between capacitor means 88 and the movable contact arms of tap changer means 130, and resistor means 90.

Tap changer means 130 map operate with both movable contact arms on the same tap position, or the movable contact arms may bridge two adjacent tap positions in order to provide a value of inductance halfway between the values of the inductance at the tap positions. The selector switch 140 and transfer switches 154 and 156 operate in a predetermined sequence, well known in the art, to effect tap changes without arcing at the no-load type selector switch 140. The selector switch 140 and load transfer switches 154 and 156 are responsive to tap changer drive means 132 through drive shafts and mechanical linkages, shown generally by dotted lines 162 and 164.

Starter means 134 controls the operation of tap changer drive means 132, and in response to sensing means 136, energizes the tap changer drive means 132 in the proper direction to return the filter branch to resonance.

Starter means 134 is connected to a source of alternating potential 170 through conductors 172 and 174, and may include a relay LM having an electromagnetic coil 176 and contacts LM1, LM2, LM3, and LM4, and a relay RM having an electromagnetic coil 178 and contacts RM1, RM2, RM3 and RM4. Starter means 18 also includes contacts L1 and R1 from sensing means 136, and contacts TC1 from tap changer means 130. Contacts TC1 from tap changer means 130 may be cam operated, and close whenever tap changer means 130 starts to change taps, and opens when the tap changer reaches its next stable operating position. Contacts L1 from sensing means 136 close when filter branch 80 is off resonance on the side in which the tap changer should reduce the number of inductor turns in the series circuit, and contacts R1 close when filter branch 80 is off resonance on the side in which the tap changer means should increase the number of inductor turns in the series circuit.

Contacts L1 and electromagnetic coil LM are serially connected across conductors 172 and 174, and contacts R1 and electromagnetic coil 178 are serially connected across conductors 172 and 174. Contacts LM4 and RM4, in that order, are serially connected from the junction between contacts L1 and electromagnetic coil 176, to the junction between contacts R1 and electromagnetic coil 178. Contacts TC1 are connected from conductor 172 to the junction between contacts LM4 and RM4.

Contacts LM1, LM2 and LM3 are connected between tap changer drive means 132, which may be a three-phase motor, and source potential 170; contacts RM1, RM2 and RM3 are connected to bridge contacts LM1, LM2 and LM3, and also to interchange two of the electrical phases. Thus, when contacts LM1, LM2 and LM3 close, drive means 132 will rotate in one direction, and when contacts RM1, RM2 and RM3 close, drive means 132 will rotate in the opposite direction.

When contacts L1 close in response to sensing means 136, electromagnetic coil 176 of relay LM will be energized, closing contacts LM1, LM2, LM3 and LM4. Drive means 132 is energized which starts to move tap changer means 130 to connect fewer turns of inductor means 92 in the circuit, and as soon as tap changer drive means starts to operate, contacts TC1 close to seal in electromagnetic coil 176 through the now closed contacts LM4. Thus, regardless of the subsequent opening of contacts L1, the tap changer means 130 will continue to operate in its previously energized direction until reaching the next stable operating position. This insures that tap changer means 130 will not stop partially through a tap change. If series resonance is regained by the tap change, contacts L1 will open and the tap changer will stop when reaching the first stable operating position in the direction in which it was driven by drive means 132. If series resonance still has not been achieved, contacts L1 will still be closed and tap changer 130 will again be driven in the same direction, to the next stable operating position, and this cycle will repeat until resonance is obtained. If the sensor means determines that more turns of inductor means 92 are required in the circuit, contacts R1 will close, energizing electromagnetic coil 178 of the relay RM, closing contacts RM1, RM2, RM3 and RM4. Tap changer drive means 132 will be energized in the direction opposite to the previously driven direction, contacts TC1 will close, and relay RM will be sealed in through contacts TC1 and RM4 until reaching a stable operating position, at which point contacts TC1 will open. If still more turns are required to achieve series resonance, contacts R1 will still be closed, starting the cycle over again, with the cycle repeating until resonance is obtained.

Sensing means 136, for actuating contacts L1 and R1 in response to circuit conditions in filter branch 80, may be of any suitable construction and arrangement. For example, the net reactive volt amperes of the filter branch may be determined, and a polarized error signal developed therefrom. At resonance, the net reactive volt amperes will be zero, as the inductive volt amperes will be equal and opposite to the capacitive reactive volt amperes. Thus, at resonance, the error signal will be zero. If the filter branch is not at resonance due to the inductive reactance $X_L$ exceeding the capacitive reactance $X_C$, the net reactive volt amperes will be inductive, which condition may be used to provide a unidirectional error signal of a predetermined polarity. If the circuit is not at resonance due to the capacitive reactance $X_C$ exceeding the magnitude of the inductive reactance $X_L$, the net reactive volt amperes will be capacitive, which condition may be used to provide a unidirectional error signal of opposite polarity. The net reactive volt amperes of filter branch 80 may be determined by sensing branch current via current transformer means 180, and by sensing the line-to-neutral voltage via potential transformer means 182, phase shifting the line-to-neutral voltage 90° in phase shifting means 184, which is well known in the art, and applying the sensed current and phase shifted voltage to transducer means 190, which provides unidirectional output voltage if the capacitive reactive volt amperes are not equal to the inductive reactive volt amperes. If the capacitive reactive volt amperes are not equal to the inductive capacitive volt amperes, transducer means 190 will provide a unidirectional error signal whose polarity will indicate which of the two reactive volt amperes are larger. Transducer means 190 may be a Hall generator connected as a Var transducer, as shown in FIG. 2. The Hall generator 192 is subjected to a field proportional to the Branch current, and the control circuit of the Hall generator is energized by the phase-to-neutral voltage. The resultant output potential, appearing at terminals 194 and 196 of the Hall generator 192, is proportional to the net reactive volt amperes in the branch. The polarized output voltage of transducer means 190 may be used in any suitable way to close contacts L1 and R1, as required. For example, FIG. 2 illustrates output terminals 194 and 196 of Hall generator 192 being connected to relays R and L, with relays R and L being polarized by diodes 198 and 200, respectively. Amplifier means (not shown) may be used to amplify the output signals or Hall voltage to a usable value, or extremely sensitive relays may be used which will be responsive to the output voltage of the Hall generator. Any other suitable circuit means may also be utilized to energize relays R and L in response to the polarity of the Hall voltage. For example, relays R and L, instead of being directly responsive to the Hall voltage may be connected to a source of potential through semiconductor switch means, such as transistors or controlled rectifiers, which are connected to switch in response to a gating signal, with the gating signals being responsive to the polarity of the Hall voltage.

Thus, when branch 80 is in resonance, the output voltage at terminals 194 and 196 will be zero. When the capacitive reactance $X_C$ of the branch exceeds the inductive reactance $X_L$ of the branch, a unidirectional output voltage will be developed at terminals 194 and 196, with terminal 196 being more positive than terminal 194. Current is thus allowed to flow through relay R, which closes contacts R1 in starter means 134. Relay RM is thus energized, which closes contacts RM1, RM2 and RM3, to energize tap changer drive means 132 in the direction necessary to increase the number of turns of inductor 192 connected in series filter branch 80. When resonance is again obtained, the signal at terminals 194 and 196 will again be zero. When the inductive reactants $X_L$ of the branch exceeds the capacitive reactance $X_C$ of the branch, a unidirectional output voltage will be developed at terminals 194 and 196, with terminal 194 being more positive than terminal 196. Current is thus allowed to flow through relay L, which closes contacts L1 in starter means 134. Relay LM is energized, which closes contacts LM1, LM2 and LM3, to energize tap changer drive means 132 in the direction necessary to decrease the number of turns of inductor 92 connected in series filter branch 80. When resonance is again achieved, the signal at terminals 194 and 196 will be zero and the tap changer drive means will be deenergized. The sensitivity of the sensing means 190 may be adjusted by providing adjustable resistors (not shown) connected in series with relays R and L.

Thus, the types of capacitors utilized in capacitor bank 88, and in the capacitor banks of the other filter branches, may be selected for cost considerations instead of stability considerations with temperature change, as the filter branches will automatically tune themselves to resonance at the particular harmonic frequency they are designed to shunt. Also, if the generated alternating current potential which is to be rectified is developed by such means as a waterwheel generator, or any other prime mover which may be subject to speed changes, the frequency control need not be precise, which allows a less costly governor to be used. This is due to the automatic tuning of the filter branches to resonance at their respective harmonic frequencies, even though the harmonic frequencies may change between predetermined limits due to a change in the fundamental frequency.

While the circuit shown in FIG. 1 has been assumed to provide a power flow from alternating current source 12 to alternating current transmission lines 58, 60 and 62, it will be understood the power flow may take place in the opposite direction by operating rectifier 16 as an inverter, and by operating inverter 20 as a rectifier. The system may be symmetrical and capable of transmitting power in either direction, as required.

Since numerous changes may be made in the above-described apparatus and different embodiments of the invention may be made without departing from the spirit thereof, it is intended that all matter contained in the foregoing description or shown in the accompanying drawings, shall be interpreted as illustrative and not in a limiting sense.

We claim as our invention:

1. A high voltage direct current power transmission system comprising:

generator means providing a first alternating potential having a first predetermined fnudamental frequency, rectifier means having alternating current input terminals and direct current output terminals, first alternating current conductor means connecting the input terminals of said rectifier means with said generator means, first harmonic filter means connected to said first alternating current conductor means for shunting predetermined orders of the harmonic frequencies of said first predetermined fundamental frequency, said first harmonic filter means having a plurality of series branches, each including capacitor and inductor means, including at least one series branch for each order of harmonic to be shunted, direct current conductor means, inverter means having direct current input terminals and alternating current output terminals for providing a second alternating potential having a second predetermined fundamental frequency, the output terminals of said rectifier means and the input terminals of said inverter means being connected by said direct current conductor means, second alternating current conductor means, said second alternating current conductor means being connected to the output terminals of said inverter means, second harmonic filter means connected to said second alternating current conductor means for shunting predetermined orders of the harmonic frequencies of said second predetermined fundamental frequency, said second harmonic filter means having a plurality of series branches, each including capacitor and inductor means, including at least one series branch for each order of harmonic to be shunted, and resonance tuning means for automatically tuning at least certain of the series branches of at least one of said first and second harmonic filter means to series resonance at the harmonic frequency of the branch, including sensor means for each series branch to be tuned which provides a polarized error signal when its associated series branch is not in resonance, and means responsive to said polarized error signal for changing the value of the inductance means in the associated series branch, as required to return the series branch to series resonance.

2. The high voltage direct current power transmission system of claim 1 wherein said sensor means is responsive to the reactive volt amperes of its associated branch, providing an error signal of one polarity when the net reactive volt amperes are capacitive, and an error signal of opposite polarity when the net reactive volt amperes are inductive, and a zero error signal when the net reactive volt amperes are zero.

3. The high voltage direct current power transmission system of claim 1 wherein each series branch of said first and second filter means includes said resonance tuning means.

4. The high voltage direct current power transmission system of claim 3 wherein said generator means for providing said first alternating potential may vary in speed between predetermined limits which changes the fundamental and harmonic frequencies, said resonance tuning means having a tuning range which allows the various series branches of said first and second harmonic filters to maintain resonance as the frequencies of the harmonic orders change.

5. The high voltage direct current power transmission system of claim 3 wherein the value of the capacitance means in each series branch of said first and second harmonic filter means changes between predetermined limits over the operating temperature range of said capacitor means, said resonance tuning means having a tuning range which allows said first and second harmonic filters to maintain resonance as the value of the capacitance changes.

6. The high voltage direct current power transmission system of claim 1 wherein said sensor means is a reactive volt ampere transducer, and the means responsive to the polarized error signal is tap changer means.

7. Harmonic filter means for shunting predetermined harmonic frequencies from an alternating current system comprising a plurality of parallel connected series branches, each of said series branches including capacitance means and inductance means having a plurality of conductor turns, each of said series branches being tuned to series resonance at a predetermined harmonic frequency, each of said series branches including sensing means for providing a signal when its associated series branch is not in series resonance, and tuning means responsive to said sensing means for automatically changing the effective number of conductor turns of said inductance means connected in each of said series branches, to maintain series resonance in the branches as the parameters which affect series resonance change.

8. The harmonic filter means of claim 7 wherein said tuning means includes tap changer means, said sensing means providing polarized error signals responsive to the net reactive volt amperes in each of said branches, said tap changer means being connected to change the number of effective turns of said inductance means in each of said branches, said tap changer means being responsive to said polarized error signals, changing the number of turns of said inductance means connected in each branch, to maintain the net reactive volt amperes in each branch substantially equal.

9. The harmonic filter means of claim 7 wherein said sensing means for each branch includes transducer means connected to sense the net reactive volt amperes in its associated branch, and said tuning includes tap changer means connected to change the number of turns of said inductance means connected in the associated branch, said transducer means providing a polarized error signal when the inductive and capacitive reactive volt amperes in the associated branch are not equal to one another, with the polarity of the error signal indicating which of the two reactive volt ampere quantities is larger, said tap changer means being responsive to said error signal, changing the number of turns of said inductance means connected in the branch, to balance the capactive and inductive volt amperes.

References Cited

UNITED STATES PATENTS

| | | | |
|---|---|---|---|
| 1,174,793 | 3/1916 | Alexanderson ------ | 333—76 X |
| 1,319,521 | 10/1919 | Fessenden et al. ---- | 333—76 X |

LEE T. HIX, *Primary Examiner.*

W. H. BEHA, Jr., *Assistant Examiner.*